United States Patent

Bridgegum

[11] 4,054,981
[45] Oct. 25, 1977

[54] HEAT EXCHANGER FOR SOLAR ENERGY

[75] Inventor: James Earl Bridgegum, Canyon Country, Calif.

[73] Assignee: Mor-Flo Industries, Inc., Santa Monica, Calif.

[21] Appl. No.: 769,413

[22] Filed: Feb. 17, 1977

Related U.S. Application Data

[62] Division of Ser. No. 677,748, April 16, 1976, abandoned.

[51] Int. Cl.² .............................................. B23P 15/26
[52] U.S. Cl. .................................. 29/157.3 R; 165/70; 165/154; 220/9 B; 237/1 A
[58] Field of Search ........................ 126/270, 271, 400; 237/1 A; 165/70, 154; 220/9 A, 9 B; 29/157.3 R

[56] References Cited

U.S. PATENT DOCUMENTS

| 3,830,290 | 8/1974 | Thamasett et al. | 165/70 |
| 3,967,591 | 7/1976 | Iida | 165/70 |

FOREIGN PATENT DOCUMENTS

| 1,117,148 | 11/1961 | Germany | 165/70 |
| 804,592 | 11/1958 | United Kingdom | 165/70 |
| 1,145,513 | 3/1969 | United Kingdom | 165/70 |

Primary Examiner—C. W. Lanham
Assistant Examiner—V. Rising
Attorney, Agent, or Firm—Ralph B. Pastoriza

[57] ABSTRACT

The heat exchanger is formed by wrapping a metal sheet about a water storage tank to define an intermediate cylinder and positioning an outer cylinder over the intermediate cylinder in sealed relation therewith to provide a relatively wide annular space about the water tank. Fluid heated by solar energy is circulated through this annular space to heat water in the tank by heat exchange through the intermediate cylinder and tank itself. A very narrow annular space is defined between the intermediate cylinder and exterior surface of the tank such that any leaks that may develop in the intermediate cylinder will result in the heated fluid passing down this annular space to the exterior so that the risk of contamination of the heated fluid with water in the tank is minimized.

2 Claims, 4 Drawing Figures

HEAT EXCHANGER FOR SOLAR ENERGY

This application is a division of Ser. No. 677,748, Apr. 16, 1976, now abandoned.

This invention relates generally to heat exchangers and more particularly to a method of manufacture of a heat exchanger and the manufactured product itself for heating water in a storage tank through the medium of solar heated fluid.

BACKGROUND OF THE INVENTION

Solar heating systems are known wherein a fluid medium is heated from large solar panels and this heated fluid then passed in a heat exchanger to in turn heat water stored in a tank. A basic problem with all such systems is the risk of contamination of the heated water in the tank with the fluid medium transferring heat from the solar panels to the water. Thus, any corrosion in the heat exchanger itself might cause intermingling of this heated fluid with the water in the tank.

The problem is particularly aggravated when appropriate chemicals are added to the fluid medium to prevent corrosion of the solar panels themselves. Such toxic substances in the fluid medium should the same become intermingled with the water through corrosion of the heat exchanger or inadvertent leaks could be dangerous to persons using the heated water in the tank. Accordingly, it has been proposed to avoid the use of any toxic substances in the heated fluid used for heating the water and instead coat the solar panels with anti-corrosive chemicals. While this solution permits a toxic free fluid medium to be used in the heat transfer process and thus even sould a leak develop avoids seriously contaminating the stored water, the necessity of providing anti-corrosive coatings and anti-rust coatings on the various solar panels as well as other portions of the system can become prohibitive. If some appropriate safety arrangement could be provided to minimize the risk of contamination of the stored water in the storage tank by the heating fluid, then heating fluid with the necessary anti-corrosive chemicals and the like even though toxic could readily be used and the vast expense involved in providing specially treated coatings for the solar panels and other component parts wholly avoided.

BRIEF DESCRIPTION OF THE PRESENT INVENTION

The present invention contemplates an improved heat exchanger arrangement in a solar heating system as well as a method of manufacturing the same wherein any risk of contamination of the heating fluid with water in a storage tank is minimized, all to the end that inexpensive solar panels not requiring any special coatings can be used.

More particularly, a water storage tank is provided and a first sheet of metal wrapped about the tank with its left and right sides pulled into overlapping relationship so as to provide a snug fit. An outer cylinder surrounds and is sealed thereto by appropriate welding to define a wide annular space. The solar heated fluid medium is circulated through this wide annular space surrounding the tank to thereby through heat exchange heat water stored in the tank. The initial surrounding sheet of metal serves as an intermediate cylinder and in turn defines a very narrow annular space between its inner wall and the exterior wall of the tank such that should any leaks develop in this intermediate cylindrical portion, the toxic heated fluid will simply flow down the narrow annular space to the exterior of the tank, the water in the tank itself remaining free of any contamination.

BRIEF DESCRIPTION OF THE DRAWINGS

A better understanding of the method and product of this invention will be had by now referring to the accompanying drawings in which.

DETAILED DESCRIPTION OF THE INVENTION

Figure 1:
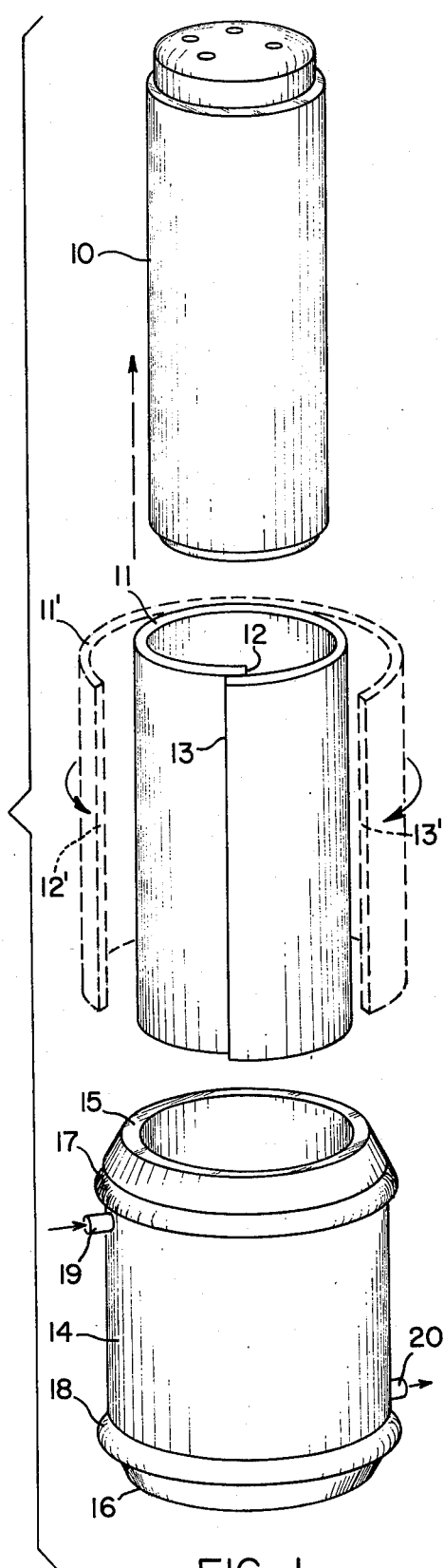
FIG. 1 is an exploded perspective view of basic components making up the heat exchanger of this invention and also illustrative of certain steps in the method of manufacture.

Referring first to FIG. 1 there is shown a water storage tank 10 preferably of cylindrical elongated shape as shown.

In accord with a first step of the method of manufacture of the heat exchanger of this invention, a sheet of metal 11 is wrapped about the cylindrical storage tank 10, its left and right sides 12 and 13 being drawn past each other into overlapping relationship so that the sheet will snugly engage the tank. The foregoing is illustrated by the dashed phantom line showing of the sheet 11 in partially wrapped position the vertical dashed arrow indicating that the same is wrapped about the tank 10. The left and right sides of the partially wrapped phantom showing 11' of the sheet are indicated at 12' and 13'.

The fairly snug wrapping of the sheet about the tank 10 constitutes an important step in that notwithstanding the snug relationship, there is still defined a narrow annular space between the interior surface of the sheet 11 and the exterior of the tank 10. The significance of this narrow annular space will become clearer as the description proceeds.

After the sheet 11 has been wrapped about the cylindrical tank 10, an outer cylinder indicated in the bottom portion of FIG. 1 at 14 as positioned about the sheet 11 which now defines essentially an intermediate cylinder. The opposite ends of this outer cylinder indicated at 15 and 16 are rolled to taper the diameter of the same to fully engage over 360° the outer surface of the sheet 11 adjacent to the opposite ends of the outer cylinder. The arrangement is such that the outer cylinder defines with the outer wall of the sheet 11 a substantially wider annular space than the heretofore referred to narrow annular space.

To facilitate the inward rolling of the opposite ends of the outer cylinder 14 to decrease their diameter as described at 15 and 16, a semi-circular shaped circumferentially extending channel is provided in the outer cylinder 14 adjacent to its opposite ends such as indicated at 17 for the end 15 and 18 for the end 16. These channels will accommodate radially directed inward stresses established when rolling of the ends to taper the diameter thereof takes place and essentially avoids any crinkling.

The outer cylinder 14 includes inlet and outlet ports 19 and 20 for the purpose of circulating heating fluid within the wider annular space defined by the outer cylinder and the outer surface of the intermediate cylinder formed from the sheet 11.

Figure 2:
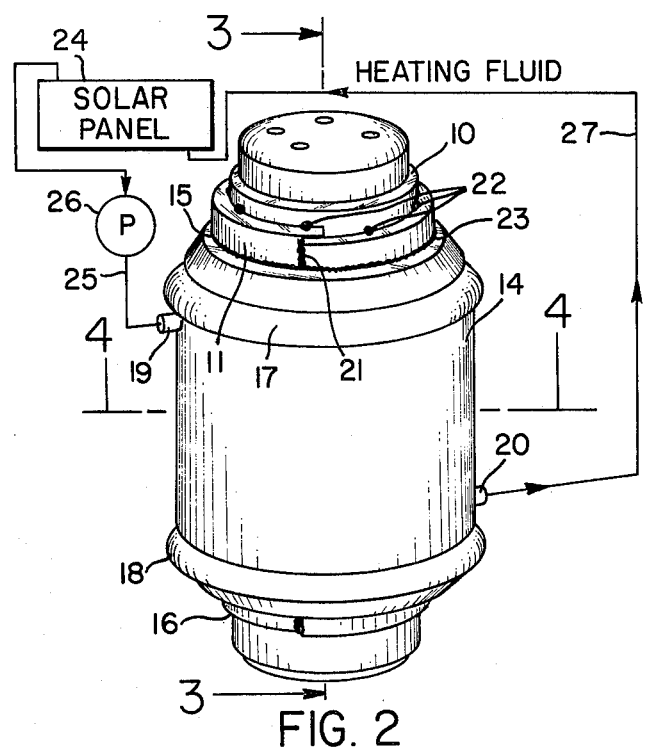
FIG. 2 is a perspective view of the completely assembled heat exchanger, a solar heating system being depicted schematically in combination with the heat exchanger.

Referring now to the assembled view of FIG. 2, it will be noted that the overlapped ends of the sheet 11 are provided with a continuous weld 21 running parallel to the axis of the water tank 10 which welding takes place after the sheet has been appropriately wrapped about the water tank and drawn into snug relationship therewith. Further, the portions of the sheet adjacent to the opposite ends of the tank 10 are spot welded to the tank at circumferentially spaced points as indicated at 22 so that there is communication between the heretofore referred to narrow annular space and the exterior between the spot welds. Finally, the opposite tapered ends of the outer cylinder 14 are welded as at 23 continuously over 360° to the adjacent outer surface portions of the sheet or intermediate cylinder 11 as indicated at 23. This welding provides a sealing of the wider annular space defined between the interior of the outer cylinder 14 and the exterior surface of the intermediate cylinder 11.

Shown in combination with the heat exchanger of FIG. 2 is a solar panel depicted by the block 24 connecting to the inlet port 19 by line 25 through pump 26. The outlet port 20 in turn connects to the solar panel as by return line 27. The pump 26 will thus circulate heated fluid from the solar panel 24 through the referred to wider annular space thus heating water within the tank 10.

Figure 3:
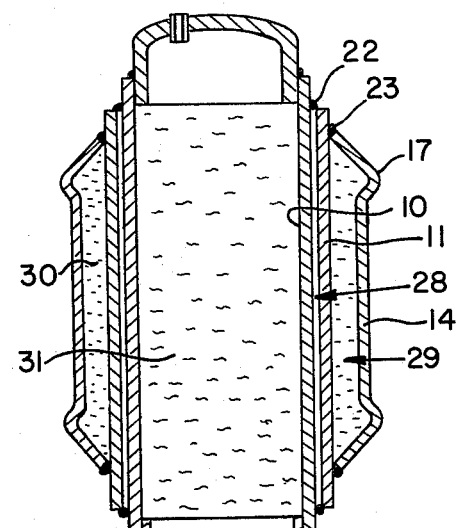
FIG. 3 is a longitudinal cross section of the heat exchanger taken in the direction of the arrows 3-3 of FIG. 2; and, FIG. 4 is a transverse cross section of the heat exchanger taken in the direction of the arrows 4-4 of FIG. 2.
Figure 4:
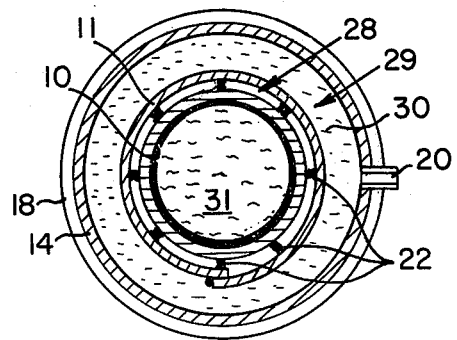

The foregoing can better be understood by referring to the cross sections of FIGS. 3 and 4.

With reference first to FIG. 3, the narrow annular space between the inside surface of the sheet or intermediate cylinder 11 and the outer surface of the tank 10 is indicated by the arrow 28 while the wider annular space between the outer surface of the intermediate cylinder or sheet 11 and outer cylinder 14 is indicated by the arrow 29. The heating fluid itself is shown at 30 within the wider annular space 29 and the water stored in the tank 10 is shown at 31. The spot welds 22 are shown in the orientation of FIG. 3 both at the top and bottom opposite ends of the intermediate cylinder 11 to the tank 10, it being understood that the narrow annular space 28 thus communicates with the exterior between these spot welds.

FIG. 4 again illustrates the narrow annular space 28 and the wider annular space 29. The size of the narrow annular space 28 is greatly exaggerated for purposes of clarity. It will be understood that because of the relatively snug engagement of the sheet 11 when wrapped about the tank 10 the narrow annular space will be quite small but nevertheless will serve an important function as will now be described.

OPERATION

In the assembly of the heat exchanger as described heretofore, the sheet 11 of FIG. 1 is wrapped about the tank 10 with its left and right sides drawn together to overlap and the continuous weld 21 shown in FIG. 2 effected to secure the overlapped portions together.

The circumferentially spaced spot welds 22 are then made so that the sheet defining the intermediate cylinder of the structure is secured to the tank 10.

The outer cylinder 14 then has formed therein the semi-circular shaped circumferentially extending channels 17 and 18 and the opposite ends are then rolled to taper their diameters as described, this outer cylinder then being positioned over the intermediate cylinder or sheet 11 and the opposite ends welded over 360° as indicated by the weld 23 of FIG. 2.

The inlet and outlet ports 19 and 20 are then connected to receive and return heated fluid from the solar panel 24, the circulation being maintained by the pump 26.

When water 31 is stored in the tank 10 as illustrated in FIG. 3, this water will become heated by the heated fluid 30 circulating through the wider annular space 29 through the medium of the intermediate cylinder 11 and outer wall of the tank. The heat transfer is not seriously impeded notwithstanding the presence of the narrow annular space 28. On the other hand, should rusting or other corrosive action occur which might cause a leak in the intermediate wall portion 11, the heated fluid 30 will simply pass into the narrow annular space 28 and drain out from between the spot welds at the lower portion of the tank. The risk of contamination of the water 31 is thus minimized.

The method step of wrapping the sheet metal 11 about the tank 10 to form the intermediate cylinder in forming the heat exchanger of this invention is important in that it serves to provide the heretofore referred to narrow annular space and also simplify the overall construction in that the overlapped portions can easily be welded and fill in plates or backing plates are not required.

Because of the minimization of risk of contamination of the water in the tank 10 by the heating fluid, appropriate anti-corrosive chemicals can be utilized in the heating fluid and thus the expense involved in coating the solar panels and component connecting portions with anti-rust materials is wholly avoided.

From the foregoing, it will thus be evident that the present invention has provided an improved heat exchanger particularly suited for conversion of solar energy into heated water.

What is claimed is:

1. A method of manufacturing a heat exchanger for solar energy wherein heat is exchanged between a solar heated fluid and water in a cylindrical storage tank, including the steps of:
   a. wrapping a sheet of metal around said cylindrical storage tank;
   b. drawing the left and right sides of the sheet past each other in overlapping relationship so that said sheet snugly engages the tank but still defines a narrow annular space between the inner wall surface of said sheet and the exterior of said tank;
   c. welding the overlapped portions of said sheet in a continuous weld along a direction parallel to the axis of said cylindrical storage tank;
   d. spot welding portions of the sheet adjacent to opposite ends of the tank to said tank at circumferentially spaced points so that there is communication between said narrow annular space and the exterior between said spot welds;
   e. surrounding said sheet with an outer cylinder;
   f. rolling the opposite ends of said outer cylinder to taper the diameter of the safe to fully engage over 360° the outer surface of said sheet adjacent to said opposite ends of said outer cylinder to define with the outer wall of said sheet a substantially wider annular space than said narrow annular space;

g. welding the engaging portions of said opposite ends of said outer cylinder over 360° to said outer surface of said sheet to seal and render fluid tight said wider annular space; and, h. providing entrance and exit ports for said wider annular space so that said solar heated fluid can be circulated therethrough to heat water in said tank, any leaks in the inner wall defining said wider annular space resulting in said heated fluid passing to the exterior through said narrow annular space so that the risk of contamination of said water in said tank by said heated fluid is minimized.

2. The method of claim 1, including the step of forming a semi-circular shaped circumferentially extending channel about said outer cylinder adjacent to its opposite ends to accommodate radially directed inward stresses established when rolling said ends to taper the diameters thereof, so that crinkling is avoided.

* * * * *